US012345966B2

(12) United States Patent
Eble et al.

(10) Patent No.: US 12,345,966 B2
(45) Date of Patent: Jul. 1, 2025

(54) LASER OUTPUT LIMITING DEVICE

(71) Applicant: Gecko Analysentechnik GmbH, Grasbrunn (DE)

(72) Inventors: Matthias Eble, Baldham (DE); Michael Weise, Berlin (DE); Stefan Seeger, Berlin (DE)

(73) Assignee: GECKO ANALYSENTECHNIK GmbH, Grasbrunn (DK)

( * ) Notice: Subject to any disclaimer, the term of this patent is extended or adjusted under 35 U.S.C. 154(b) by 491 days.

(21) Appl. No.: 17/909,339

(22) PCT Filed: Mar. 20, 2020

(86) PCT No.: PCT/EP2020/057769
§ 371 (c)(1),
(2) Date: Sep. 2, 2022

(87) PCT Pub. No.: WO2021/185453
PCT Pub. Date: Sep. 23, 2021

(65) Prior Publication Data
US 2023/0086020 A1  Mar. 23, 2023

(51) Int. Cl.
*G02F 1/01* (2006.01)
*G01J 3/02* (2006.01)
(Continued)

(52) U.S. Cl.
CPC ............ *G02F 1/0147* (2013.01); *G01J 3/021* (2013.01); *G01J 3/108* (2013.01); *G01J 3/42* (2013.01);
(Continued)

(58) Field of Classification Search
None
See application file for complete search history.

(56) References Cited

U.S. PATENT DOCUMENTS

| 3,834,793 A | 9/1974 | McConnell et al. |
| 2006/0132905 A1* | 6/2006 | Wu ................ G02B 5/00 359/359 |
| 2006/0132906 A1 | 6/2006 | Wu et al. |

FOREIGN PATENT DOCUMENTS

| DE | 19528094 A1 | 2/1997 |
| EP | 0534083 A2 | 3/1993 |

OTHER PUBLICATIONS

International Search Report dated: Nov. 27, 2020 in International Application No. PCT/EP2020/057769, filed: Mar. 20, 2020 and published as: WO/2021/185453 A1 on Sep. 23, 2021.

* cited by examiner

*Primary Examiner* — Bao-Luan Q Le
*Assistant Examiner* — Danell L Owens
(74) *Attorney, Agent, or Firm* — Schmeiser, Olsen & Watts LLP

(57) ABSTRACT

The present invention relates to a device and a method for limiting the output of a laser, wherein a reflecting device arranged in the optical path of a laser beam comprises a switching layer which comprises or consists of a material exhibiting a metal-insulator transition and a reflecting layer which is positioned downstream of the switching layer in the optical path of the laser beam, wherein the reflecting device is configured such that an output of the laser beam when it is incident upon the reflecting device which exceeds a predefined threshold causes a change in the refractive index of the material in the switching layer, and the output of the laser beam reflected by the reflecting device is thus reduced as compared to the output of the laser beam when it is incident upon the reflecting device due to reduced reflection by the reflecting device.

17 Claims, 2 Drawing Sheets

(51) Int. Cl.
*G01J 3/10* (2006.01)
*G01J 3/42* (2006.01)
*G02B 1/11* (2015.01)
*G02F 1/19* (2019.01)

(52) U.S. Cl.
CPC .................. *G02B 1/11* (2013.01); *G02F 1/19* (2013.01); *G02F 2203/52* (2013.01)

LASER OUTPUT LIMITING DEVICE

RELATED APPLICATIONS

The present application is a national stage application under 35 U.S.C. section 371, which claims the benefit of priority to PCT Application No. PCT/EP2020/057769, having a filing date of Mar. 20, 2020, titled "APPARATUS FOR LIMITING LASER POWER", naming Matthias EBLE et al. as inventors, which is incorporated by reference herein in its entity.

TECHNICAL FIELD

The present invention relates to a device and a method for limiting the output of a laser, by means of which the output of a laser beam reflected by a reflecting device is reduced, as compared to the output of the laser beam when it is incident upon the reflecting device, as soon as the output of the incident laser beam exceeds a predefined threshold.

BACKGROUND

Laser spectroscopic methods are used in a variety of technical fields for examining a wide variety of objects, including gases, wherein electrons in the electron shell of the substance to be examined are raised to a higher energy level with the aid of the energy provided by the laser beam. The proportion of the energy which is then absorbed by the electrons can be measured using suitable detectors, as can the energy which is emitted when the electrons fall back to a lower, stable level, which ultimately allows conclusions to be drawn about the constituent or constituents of the substance to be examined.

In some examinations, however, it is desirable and in some cases even essential for the energy introduced into the substance to be examined via the laser beam to be below a predefined limit. This is for example the case when examining (highly) explosive gases. However, when using diodes as the pump source of the laser, the problem arises that they "die" suddenly at the end of their service life and can then emit an output which is up to ten times higher than their rated output. Since, as with all technical components, their service life cannot be precisely predicted and such diodes also fail abruptly, precautions must be taken in safety-relevant applications of such lasers in order to prevent damage caused by sudden power spikes. Such damage can also be caused by voltage spikes in a laser's power supply, such as for example occur when lightning strikes.

When examining objects which are comparatively difficult to ignite, such as solids, shut-down devices can for example be provided which switch off the laser source as soon as an emitted output which is too high is measured. Such shut-down devices are however regularly too "sluggish" for examining highly explosive gas mixtures, such that a level of energy which is too high would already have been introduced into the gas mixture before the laser source could be switched off in response. In such cases, it is therefore only possible to examine small samples of the gas to be examined by means of laser spectroscopy, such that ignition of the gas, for example when a pump diode of the laser fails, does not result in damage.

Due to the problems outlined above, however, it has hitherto not been possible to examine highly explosive gases in ongoing processes by means of laser spectroscopy.

SUMMARY

It is accordingly the aim of the present invention to provide a way of reducing or even switching off an output of a laser beam which may be too high, in a rapid response, so as to enable its use even in sensitive applications, such as for laser spectroscopy of ongoing processes involving a highly explosive gas.

This object is achieved by the subject-matter of coordinated patent claims 1, 14 and 15, wherein the sub-claims define preferred embodiments of the present invention.

A first aspect of the present invention relates to a laser output limiting device comprising a reflecting device arranged in the optical path of a laser beam, in particular a laser beam of a predefined wavelength, and
    a switching layer which comprises or consists of a material exhibiting a metal-insulator transition and
    a reflecting layer which is positioned downstream of the switching layer in the optical path of the laser beam,
wherein the reflecting device is configured such that an output of the laser beam when it is incident upon the reflecting device which exceeds a predefined threshold causes a change in the refractive index of the material in the switching layer, and the output of the laser beam reflected by the reflecting device is thus reduced as compared to the output of the laser beam when it is incident upon the reflecting device due to reduced reflection by the reflecting device.

In other words, the device in accordance with the invention comprises at least one reflecting device at which the laser beam emitted by a laser source is reflected, in order to then be directed to a target. The at least one reflecting device is thus positioned between the laser source and the target of the laser beam, wherein it is in principle also conceivable for multiple reflecting devices which are positioned sequentially to consecutively reflect the laser beam. The reflecting device then comprises at least one switching layer and at least one reflecting layer which is arranged on the side of the at least one switching layer which faces away from the laser beam when it is incident upon the reflecting device.

The switching layer comprises or consists of a material exhibiting a metal-insulator transition, i.e. one which can exhibit different properties which are separated by a so-called phase transition, in particular with regard to its refractive index and/or reflectivity. As soon as the state of the material exceeds or falls below the phase transition, the properties of the material also change accordingly.

The present invention utilizes this quantum mechanical effect when limiting the output of laser beams. As long as the material exhibiting the metal-insulator transition is in a type of base state, which can for example obtain at room temperature, the material can exhibit a refractive index which results in a comparatively high reflectivity of the reflecting device. However, as soon as the material is excited by an inadmissibly high-output laser beam, its refractive index changes, which ultimately affects the reflectivity of the reflecting device, i.e. the reflecting device of the present invention is configured such that a laser having an inadmissibly high output, in particular in relation to a predefined area of the reflecting device, excites the material in the switching layer in such a way that its reflectivity decreases, whereas its absorptivity increases, i.e. the output of the laser beam reflected by the reflecting device can be significantly reduced by exciting the material in the switching layer, up to an essentially complete absorption of the laser output by the reflecting device. Since these effects occur within a very short time, the device in accordance with the invention is particularly well suited to applications in which a laser output has to be reduced or even switched off in a particularly rapid response.

In accordance with a preferred embodiment, the reflecting device is configured as a stack of multiple layers which are arranged one above the other and which contact each other, wherein one or more or all of the layers of said stack can be applied to the respective underlying layer by means of a coating process, in particular by means of so-called "sputtering". In this way, layers can be produced in the nanometer range necessary for the present invention. Specifically, a multitude of different layers having a desired thickness and exhibiting the properties desired for achieving the object in accordance with the invention can be applied to a so-called substrate or support structure.

In accordance with another embodiment of the present invention, the reduced reflection by the reflecting device is caused by a phase transition in the material, in particular a transition of the material from a metal state to an insulator state. The present invention can in principle utilize any change in any material properties of the material exhibiting a metal-insulator transition, without having to (fully) complete a phase transition.

The invention can also utilize any type of excitation of the material exhibiting a metal-insulator transition which causes a change in the refractive index or reflectivity/absorptivity of the material. In accordance with one embodiment, the change in the refractive index or absorptivity/reflectivity of the material, in particular a corresponding phase transition of the material, is temperature-induced and/or photo-induced. In this way, it is possible to cause a desired change in the material properties by heating or cooling the switching layer or by "irradiating" the switching layer by means of the laser.

In a preferred embodiment, the output limiting device is configured such that the change in the refractive index or reflectivity/absorptivity of the material is caused substantially by the energy introduced into the switching layer by means of the laser beam, i.e. in other words, no additional device for exciting the switching layer and the material situated within it is necessary in this case. Accordingly, the output limiting device can be "switched" solely by the laser beam itself.

It is however also conceivable to provide additional devices which are configured to excite the material in the switching layer, for example a heating device, by which the material in the switching layer can already be excited to a certain degree, such that it is in a desired state, for example close to a phase transition. This means that only a small input of energy from the laser is required in order to cause a desired change in the material properties. In certain applications, the sensitivity of the switching layer and/or the reflecting device can be increased by such an additional (heating) device.

In accordance with another embodiment of the present invention, the material exhibiting the metal-insulator transition is vanadium(IV) oxide ($VO_2$).

For some applications, instead of a single switching layer and a single reflecting layer, a plurality of switching layers and reflecting layers can be provided which reflect the laser beam in the manner of a Bragg mirror, wherein the reflecting layers which alternate with the switching layers can comprise or consist of a material which has a lower refractive index than the material exhibiting the metal-insulator transition, in particular if the latter is in its metal state. Specifically, the reflecting layers can comprise or consist of silicon dioxide ($SiO_2$) and/or titanium dioxide ($TiO_2$).

The at least one reflecting layer can in principle comprise or consist of a metal, in particular:
aluminum (Al);
palladium (Pd);
titanium (Ti);
silver (Ag);
gold (Au).

It is also conceivable for the reflecting layer to comprise multiple layers of different metals; in particular, the main part of the reflecting layer can consist of a first metal and, for example for reasons of adhesion, can be flanked on both sides by layers of another metal which better adheres to the adjoining layers of the stack of layers.

It is conceivable, for certain embodiments, for the reflecting device to comprise—in addition to the at least one switching layer and the at least one reflecting layer—an anti-reflection layer which is arranged above the switching layer, i.e. upstream of it in the optical path of the laser beam. Such an anti-reflection layer can help to improve the optical properties of the reflecting device, but can also be provided for reasons of mechanical durability in the reflecting device and/or the stack of layers. The anti-reflection layer can in particular comprise or consist of at least one of the following materials:
silicon dioxide ($SiO_2$);
magnesium oxide (MgO);
Magnesium fluoride ($MgF_2$).

Furthermore, the reflecting device can also comprise one or more intermediate layers, in particular between the switching layer and the reflecting layer and/or between the reflecting layer and a carrier structure or substrate. The at least one intermediate layer can comprise or consist of at least one of the following materials:
silicon dioxide ($SiO_2$);
magnesium oxide (MgO);
Magnesium fluoride ($MgF_2$).

Such intermediate layers can for example serve to improve optical properties of the reflecting device or also to improve thermal conduction within the reflecting device, in particular to dissipate and/or distribute heat from and/or within the reflecting device.

In accordance with another embodiment, the output limiting device is configured to limit the output of a laser source which is suitable for laser spectroscopy, in particular a VIS laser or NIR laser, specifically a laser having a wavelength of 532 nm, 785 nm or 1064 nm.

Another aspect of the present invention relates to the use of a laser output limiting device in accordance with any one of the above embodiments in a laser spectroscopy device or for a laser spectroscopy method.

Another aspect of the present invention relates to a method for limiting the output of a laser, comprising the following steps:
providing a laser source which emits a laser beam, in particular a laser source comprising a pump diode;
arranging an output limiting device in accordance with any one of the preceding embodiments in the optical path of a laser beam emitted by the laser source, wherein the reflecting device of the output limiting device is configured such that an output of the laser beam when it is incident upon the reflecting device which exceeds a predefined threshold causes a change in the refractive index of the material in the switching layer of the reflecting device, and the output of the laser beam reflected by the reflecting device is thus reduced as compared to the output of the laser beam when it is incident upon the reflecting device due to reduced reflection by the reflecting device.

In accordance with one embodiment, the method can be performed in the field of laser spectroscopy, wherein the laser beam reflected by the reflecting device is directed to an object to be examined, for the purpose of laser spectroscopy.

Preferred embodiments of the present invention are explained in more detail below by referring to the attached figures. The present invention can comprise all the features disclosed in the description of the figures or in the general portion of the description, individually and in any expedient combination. Features described in connection with one aspect in accordance with the invention can likewise be combined with any other features described in connection with another aspect.

BRIEF DESCRIPTION OF THE DRAWINGS

There is shown.

DETAILED DESCRIPTION

Figure 1:
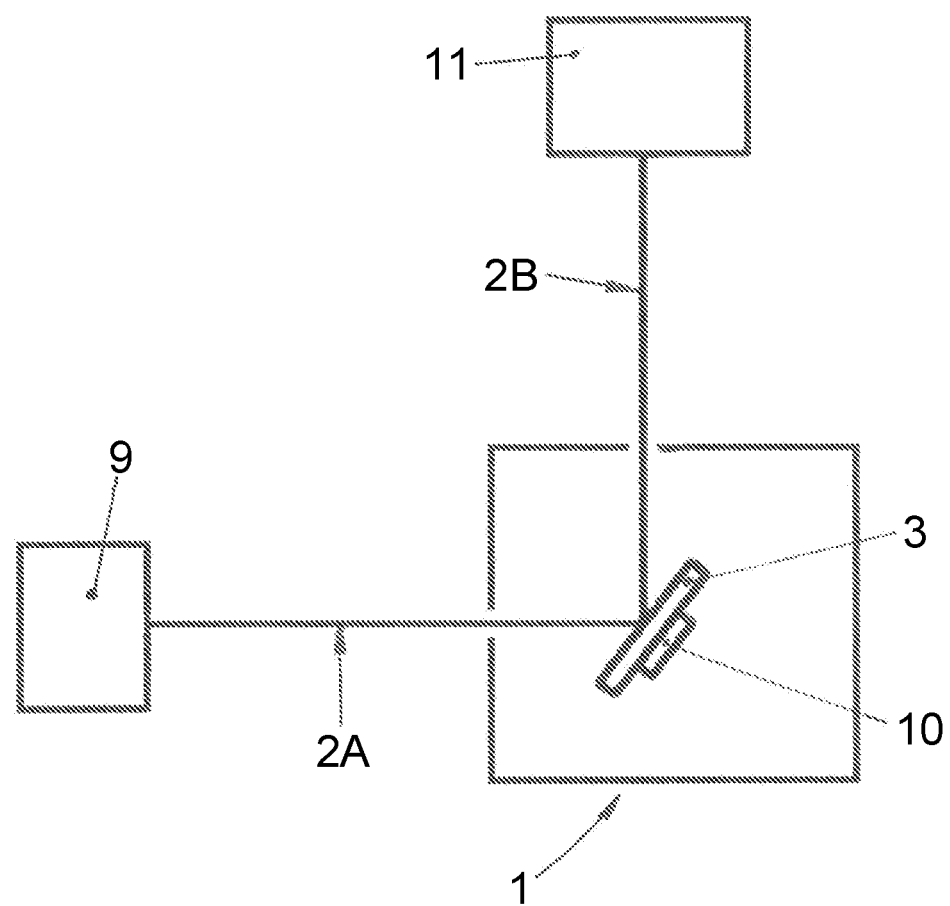
FIG. 1 a schematic representation of the arrangement of a system which is suitable for laser spectroscopy.

FIG. 1 shows an example of a schematically shown arrangement of a system for laser spectroscopy, wherein a laser source 9 emits a laser beam 2A having a predefined wavelength of 785 nm and a substantially predefined output. Before said laser beam 2A hits an object 11 which is to be examined by means of laser spectroscopy, the laser beam 2A is reflected on a reflecting device 3 of the laser output limiting device 1 in accordance with the invention. As long as the output of the laser beam 2B which hits the object 11 is below a predefined threshold of 35 mW, the laser beam 2A is reflected on the reflecting device 3 substantially unhindered. The laser beam 2B which is reflected directly by the reflecting device 3 accordingly exhibits almost the same output as the incident laser beam 2A.

Figure 2:
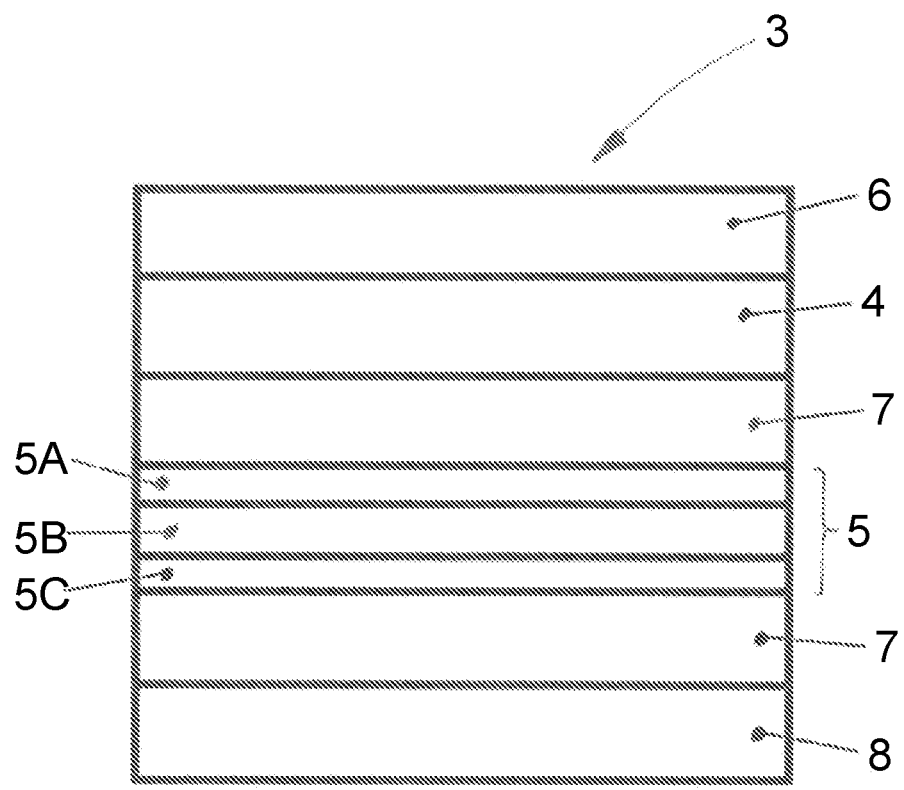
FIG. 2 a schematic representation of a reflecting device or stack of layers in accordance with the present invention.

FIG. 2 shows a schematic detailed view of the reflecting device 3 from FIG. 1 which is configured as a stack of layers, wherein the laser beam 2A is incident upon the reflecting device 3 from above in the representation in FIG. 2.

The stack of layers shown in FIG. 2 exhibits the following arrangement: a silicon substrate having a thickness in the range of 200 nm to 0.7 mm (preferably about 0.5 mm) is provided as a carrier structure 8 which supports the entire stack of layers and to which a first intermediate layer 7 of silicon dioxide having a thickness in the range of 50 nm to 150 nm (preferably about 140 nm) is applied by sputtering. The reflecting layer 5 which is applied to this intermediate layer 7, also by means of sputtering, substantially consists of a palladium layer 5B having a thickness in the range of 50 nm to 200 nm (preferably about 150 nm), which is flanked on both sides by layers 5A and 5C consisting of titanium and having a thickness in the range of 1 nm to 5 nm (preferably about 2 nm) and in the range of 0.3 nm to 0.7 nm (preferably about 5 nm), respectively. The reflecting layer 5 is in turn followed by an intermediate layer 7 made of silicon dioxide and having a thickness in the range of 120 nm to 300 nm (preferably about 282 nm), followed by the switching layer 4 made of vanadium(IV) oxide and having a thickness in the range of 30 nm to 150 nm (preferably about 112 nm). The stack of layers 3 is completed by the anti-reflection layer 6 which is applied to the switching layer 4, consists of silicon dioxide and has a thickness in the range of 20 nm to 80 nm (preferably about 69 nm).

At room temperature, the vanadium(IV) oxide of the switching layer 4 is in a metal state and accordingly exhibits comparatively good reflectivity. The reflecting device 3 is configured such that as long as the output of the laser beam 2B which hits the object 11 is below a predefined threshold of 35 mW, the vanadium(IV) oxide remains in its metal state and the laser beam 2A is reflected by the reflecting device 3 with no appreciable losses and ultimately hits the object 11 which is to be examined as the reflected laser beam 2B. At least one filter, in particular a grey filter (not shown), which is arranged in the beam path of the laser beam 2B between the reflecting device 3 and the object 11 reduces the output of the laser beam 2B to a value below the threshold value of 35 microwave, i.e. in the example shown, the laser output required for a phase transition in the switching layer 4 is adapted to the absorptivity of the downstream filter and is correspondingly higher.

The reflecting device 3 is also configured such that an output of the laser beam 2A when it is incident upon the reflecting device 3 which exceeds the predefined threshold of 35 mW introduces enough energy into the switching layer 4 that a phase transition of the vanadium(IV) oxide in the switching layer 4 from a metal state to an insulator state occurs. After this phase transition, the vanadium(IV) oxide exhibits a substantially lower reflectivity than in the metal state, but also a substantially improved absorptivity. Consequently, the laser beam 2A which hits the reflecting device 3 is almost completely absorbed by the reflecting device 3, in particular the switching layer 4, such that there is practically no longer a reflected laser beam 2B.

The laser beam 2A is thus successfully kept away from the object 11 to be examined, by means of the output limiting device 1 in accordance with the invention, if the laser beam 2B exhibits an inadmissibly high output of more than 35 mW and thus could cause damage at the location of the object 11 to be examined.

The device in accordance with the invention and the method in accordance with the invention are in principle suitable for limiting the output of all types of laser beam. Without deviating from the basic principle of the present invention, the reflecting device can be adapted to any laser wavelengths by adjusting the individual layer thicknesses, as well as to a desired threshold for the output of the laser at which a change in the refractive index, in particular a phase transition of the material in the switching layer 4, occurs. In addition, by varying individual layer thicknesses, it is possible to control the switching times of the output limiting device and/or the inertia of the switching layer 4.

FIG. 1 also shows a heating device 10 which is arranged below the substrate 8 and introduces energy into the switching layer 4 in order to move the state of the material in the switching layer 4 close to its phase transition. This increases the sensitivity of the switching layer 4, such that only a small additional input of energy via the laser beam 2A is necessary in order to generate a phase transition of the material in the switching layer 4.

What is claimed is:

1. A laser output limiting device comprising
a reflecting device arranged in an optical path of a laser beam of a predefined wavelength,
a switching layer which comprises a material exhibiting a metal-insulator transition,
a reflecting layer which is positioned downstream of the switching layer (4) in the optical path of the laser beam, and
wherein the reflecting device is configured such that an output of the laser beam when it is incident upon the reflecting device which exceeds a predefined threshold causes a change in the refractive index of the material in the switching layer, and an output of the laser beam reflected by the reflecting device is thus reduced as compared to the output of the laser beam when it is incident upon the reflecting device due to reduced reflection by the reflecting device.

2. The laser output limiting device according to claim 1, wherein the reflecting device is configured as a stack of multiple layers which are arranged one above the other and which contact each other, wherein one or more of the layers of the reflecting device is/are applied to a respective underlying layer by means of a coating process that comprises sputtering.

3. The laser output limiting device according to claim 1, wherein the reduced reflection by the reflecting device is caused by a phase transition in the material from a metal state to an insulator state.

4. The laser output limiting device according to claim 1, wherein the change in the refractive index, in particular the phase transition of the material, is temperature-induced and/or photo-induced.

5. The laser output limiting device according to claim 1, which is configured such that the change in the refractive index includes a phase transition of the material caused substantially by energy introduced into the switching layer by means of the laser beam.

6. The laser output limiting device according to claim 1, further comprising a heating device which supplies energy to the switching layer.

7. The laser output limiting device according to claim 1, wherein the material comprises vanadium oxide.

8. The laser output limiting device according to claim 1, further comprising a Bragg mirror which comprises multiple layers featuring the material which alternate with layers featuring at least one other material, the refractive index of which differs from the refractive index of the material and is lower than the refractive index of the material in its metal state, and wherein the at least one other material comprises silicon dioxide and/or titanium dioxide.

9. The laser output limiting device according to claim 1, wherein the reflecting layer comprises at least one of aluminum, palladium, titanium, silver, and gold.

10. The laser output limiting device according to claim 9, wherein the reflecting layer comprises multiple layers of different metals.

11. The laser output limiting device according to claim 1, further comprising an anti-reflection layer which is positioned upstream of the switching layer in the optical path of the laser beam and comprises at least one of silicon dioxide, magnesium oxide, and magnesium fluoride.

12. The laser output limiting device according to claim 1, further comprising at least one intermediate layer disposed between the switching layer and the reflecting layer and/or disposed between the reflecting layer (5) and a carrier structure and wherein the at least one intermediate layer comprises at least one of silicon dioxide, magnesium oxide, and magnesium fluoride.

13. The laser output limiting device according to claim 1, wherein the laser output limiting device is configured to limit the output of a laser which is suitable for laser spectroscopy which has a wavelength of 532 nm, 785 nm or 1064 nm.

14. A method for limiting the output of a laser, comprising:
    providing a laser source which emits a laser beam comprising a pump diode; and
    arranging a laser output limiting device according to claim 1 in an optical path of the laser beam emitted by the laser source, wherein a reflecting device of the output limiting device is configured such that an output of the laser beam when it is incident upon the reflecting device and exceeds a predefined threshold causes a change in the refractive index of the material in a switching layer of the reflecting device, and the output of the laser beam reflected by the reflecting device is thus reduced as compared to the output of the laser beam when it is incident upon the reflecting device due to reduced reflection by the reflecting device.

15. The method according to claim 14, wherein the laser beam reflected by the reflecting device is directed to an object to be examined, for the purpose of laser spectroscopy.

16. A method of using a laser output limiting device, comprising:
    providing a laser output limiting device including:
        a reflecting device arranged in an optical path of a laser beam of a predefined wavelength,
        a switching layer which comprises a material exhibiting a metal-insulator transition,
        a reflecting layer which is positioned downstream of the switching layer in the optical path of the laser beam, and
        wherein the reflecting device is configured such that an output of the laser beam when it is incident upon the reflecting device which exceeds a predefined threshold causes a change in the refractive index of the material in the switching layer, and an output of the laser beam reflected by the reflecting device is thus reduced as compared to the output of the laser beam when it is incident upon the reflecting device due to reduced reflection by the reflecting device; and
    using the laser output limiting device in a laser spectroscopy device.

17. A method of using a laser output limiting device, comprising:
    providing a laser output limiting device comprising:
        a reflecting device arranged in an optical path of a laser beam of a predefined wavelength,
        a switching layer which comprises a material exhibiting a metal-insulator transition,
        a reflecting layer which is positioned downstream of the switching layer in the optical path of the laser beam, and
        wherein the reflecting device is configured such that an output of the laser beam when it is incident upon the reflecting device which exceeds a predefined threshold causes a change in the refractive index of the material in the switching layer, and an output of the laser beam reflected by the reflecting device is thus reduced as compared to the output of the laser beam when it is incident upon the reflecting device due to reduced reflection by the reflecting device; and
    using the laser output limiting device for laser spectroscopy.

* * * * *